United States Patent
Koyama et al.

(10) Patent No.: US 8,177,019 B2
(45) Date of Patent: May 15, 2012

(54) STEERING DEVICE FOR VEHICLE

(75) Inventors: Shoji Koyama, Okazaki (JP); Ryohei Hayama, Nabari (JP); Tomoyasu Kada, Kaizuka (JP)

(73) Assignee: Jtekt Corporation, Osaka-shi (JP)

( * ) Notice: Subject to any disclaimer, the term of this patent is extended or adjusted under 35 U.S.C. 154(b) by 763 days.

(21) Appl. No.: 11/964,295

(22) Filed: Dec. 26, 2007

(65) Prior Publication Data

US 2008/0164087 A1    Jul. 10, 2008

(30) Foreign Application Priority Data

Dec. 28, 2006    (JP) ................................. 2006-355658

(51) Int. Cl.
*B62D 5/04*    (2006.01)
(52) U.S. Cl. ........................ 180/446; 180/402
(58) Field of Classification Search .................. 180/446, 180/402
See application file for complete search history.

(56) References Cited

U.S. PATENT DOCUMENTS

| | | | |
|---|---|---|---|
| 6,678,595 B2 * | 1/2004 | Zheng et al. ..................... | 701/41 |
| 6,751,539 B2 * | 6/2004 | Uenuma et al. ................ | 180/446 |
| 7,004,280 B2 * | 2/2006 | Shirato et al. .................. | 180/446 |
| 7,617,033 B2 * | 11/2009 | Katou ............................. | 701/41 |
| 7,734,406 B1 * | 6/2010 | Oppenheimer et al. ........ | 701/70 |
| 2003/0127276 A1 | 7/2003 | Shimizu et al. | |

FOREIGN PATENT DOCUMENTS

| | | | |
|---|---|---|---|
| EP | 1097855 A2 | * | 5/2001 |
| EP | 1 357 007 A2 | | 10/2003 |
| EP | 1 415 893 A2 | | 5/2004 |
| JP | 2001191937 A | * | 7/2001 |
| JP | 2003-63434 | | 3/2003 |
| JP | 2004-42829 | | 2/2004 |
| JP | 2006-2805 | | 1/2006 |
| WO | WO 2006/018027 A2 | | 2/2006 |
| WO | WO 2006/064343 A2 | | 6/2006 |

* cited by examiner

*Primary Examiner* — Paul N Dickson
*Assistant Examiner* — Wesley Potter
(74) *Attorney, Agent, or Firm* — Oblon, Spivak, McClelland, Maier & Neustadt, L.L.P.

(57) ABSTRACT

It is one object of the present invention to provide a steering device for a vehicle improving a resolution of detecting a steering reaction force thereby to control precisely a reaction actuator and to improve a steering feeling.

The steering device for the vehicle is equipped with a reaction actuator 19 acting a steering reaction force on a steering wheel 1. This device further includes a steering angle sensor 11 detecting a steering angle δh of the steering wheel 1, a controller 20 controlling the reaction actuator 19 according to the steering angle δh, a torque sensor 12 detecting a steering torque Th acted on the steering wheel 1. The controller 20 controls in a feedback way the reaction actuator 11 based on the steering torque Th in a predetermined range including a middle point of the steering angle. The controller 20 drives, in a open-loop way without feed-backing the steering torque Th, the reaction actuator 19 out of the predetermined range of the steering angle δh.

8 Claims, 3 Drawing Sheets

STEERING DEVICE FOR VEHICLE

INCORPORATION BY REFERENCE

The present application claims priority under 35 U.S.C. §119 to Japanese Patent Application No. 2006-355658, filed on Dec. 28, 2006. The content of this application is incorporated herein by reference in the entirety.

BACKGROUND OF THE INVENTION

1. Field of the Invention

The present invention relates to a steering device for a vehicle of a power steering device or a steer-by-wire system, especially the steering device for the vehicle having a reaction actuator to act a reaction force on a steering wheel or other steering member.

2. Description of the Related Art

It is well known that there is the electrical power steering device to assist steering operation by applying the steering force created by an electrical motor to the steering mechanism. The conventional electrical power steering is equipped with a controller to drive the electrical motor according to a steering torque applied to the steering wheel by a driver to achieve the adequate steering assist force according to the steering torque.

There is also well known a steer-by-wire system having no mechanical connection between the steering wheel and the steering mechanism by detecting a steering angle of the steering wheel by a sensor and transmitting the detected steering angle by a wire to generate the driving force to an actuator for steering according to an output from the sensor, as shown in a published patent applications of Tokkai 2001-191937 or 2003-63434. The steer-by-wire system can change freely a ratio of steered angle of steered wheel (herein called as a steered ratio) against the steering angle of the steering wheel. It can achieve a stable control of a vehicle motion by controlling the steering angle by the actuator for steering independently to an operation of the steering wheel.

There is other steering device for the vehicle to be able to change the steered ratio than the steer-by-wire system, for example, a variable gear ratio steering system to be able to change a rotation transmission ratio between the steering wheel and the steering mechanism, as shown in a published patent applications of Tokkai 2006-2805 or 2004-42829.

Since there is no mechanical connection between the steering wheel and the steering mechanism in the steer-by-wire system, a steered reaction force of a self-aligning torque from the steered wheel is not transmitted to the steering wheel. Therefore, it is equipped with a reaction actuator to transmit the reaction force to the steering wheel. The reaction actuator is controlled based on a steering angle and a steering torque applied to the steering wheel. This is executed by setting a target steering torque based on the steering angle and controlling in a feedback way the reaction actuator in order to coincide an actual steering torque with the target steering torque.

For this feedback control in the conventional steering device for the vehicle, a torque sensor is equipped to detect the steering torque applied to the steering wheel. An analog torque signal from the torque sensor is input into an analog-digital input port of a micro computer and the micro computer calculates the target steering torque based on the steering angle and controls the reaction actuator by receiving a feedback signal from the torque sensor.

However, since a range of the input voltage in the analog-digital input port of the micro computer is predetermined, a range of the detected torque should be wide so that it forces to make a wide range of the output variation from the torque sensor. Therefore, it makes a worse resolution of the detected torque thereby to make a control-ability of the reaction actuator worse and to restrain an improvement of a steering feeling.

In detail, it should be transmitted a stroke end feeling to the driver by acting the large steering reaction force to the steering wheel around a maximum steering angle. And also it should be transmitted a small reaction force to the steering wheel around a neutral position of the steering angle because a self-aligning torque is small. Therefore, the micro computer should be set all range of the output from the torque sensor to the range of the input voltage of the analog-digital input port so that the resolution of the torque signal should be low after it is transformed to the digital signal.

Instead of the steer-by-wire system, one of the power steering devices or the variable gear ratio steering system can be installed the reaction actuator to control the steering reaction force. However, the same problem to the steer-by-wire system should be happened in these devices or systems.

SUMMARY OF THE INVENTION

In view of the previously mentioned circumstances, it is an object of the present invention to provide a steering device for a vehicle improving a resolution of detecting a steering reaction force thereby to control precisely a reaction actuator and to improve a steering feeling.

In order to achieve the above and other objects, one aspect of the present invention provides a steering device for a vehicle mainly including a reaction controller controlling in a feedback way a reaction actuator based on a steering reaction force detected by a steering reaction detecting member where a steering stage detecting member detects a steering stage around a predetermined range including middle point, and controlling the reaction actuator in an open-loop way without feed-backing the steering reaction force detected by the steering reaction detecting member where the steering stage detecting member detects the steering stage out of the predetermined range. Thereby, the output from the steering reaction detecting member is meaningful in the range correspondent to the steering stage within the predetermined range including the middle point, and is not fed back to the reaction controller controlling the reaction actuator out of the predetermined range of the steering stage. This makes the way that it is sufficient to transform to the digital signal the output only within the predetermined range of the output fed back to the reaction controller where the reaction controller of a micro computer is input the digital signal transformed the output signal from the steering reaction detecting member. So that it is possible to transform in high resolution the output signal within the predetermined range of the output signal fed back to the reaction controller compared to the above-mentioned well known device transforming to the digital signal all range of the output from the steering reaction detecting member. Therefore, it makes high accuracy of controlling the reaction actuator to improve the control-ability of the reaction actuator and the steering feeling. On the other hand, it is no need to control so precisely the steering reaction out of the predetermined range of the steering stage because the steering reaction force is large. Therefore, it does not make the steering feeling worse out of the predetermined range of the steering stage.

The second aspect of the present invention provides a steering device for a vehicle wherein the steering stage detecting member includes a steering angle detecting member. Thereby, this achieves high precise control of the reaction actuator within a small predetermined range of the steering angle to improve the steering feeling. On the other hand, this does not make the steering feeling worse even though without the feedback control because the steering reaction force is relatively large. On this result, this improves better steering feeling in full range of the steering angle.

The third aspect of the present invention provides a steering device for a vehicle wherein the steering reaction detecting member includes a steering reaction detecting member acted on the steering wheel. Thereby, this achieves better control of the reaction actuator because it detects steering torque acting on the steering wheel as the steering reaction force.

The fourth aspect of the present invention provides a steering device for a vehicle wherein the reaction controller includes an analog-digital transforming member transforming an output signal of the steering reaction detecting member to digital signal. Thereby, the steering controller prepares only predetermined range of the output signal in full range of the output signal from the steering detecting member for controlling in the feedback way the reaction actuator. Thereby, it achieves high resolution transformer transforming the predetermined range of the output signal to digital signal so that this controls the reaction actuator high preciously to make a better steering feeling.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

Figure 1:
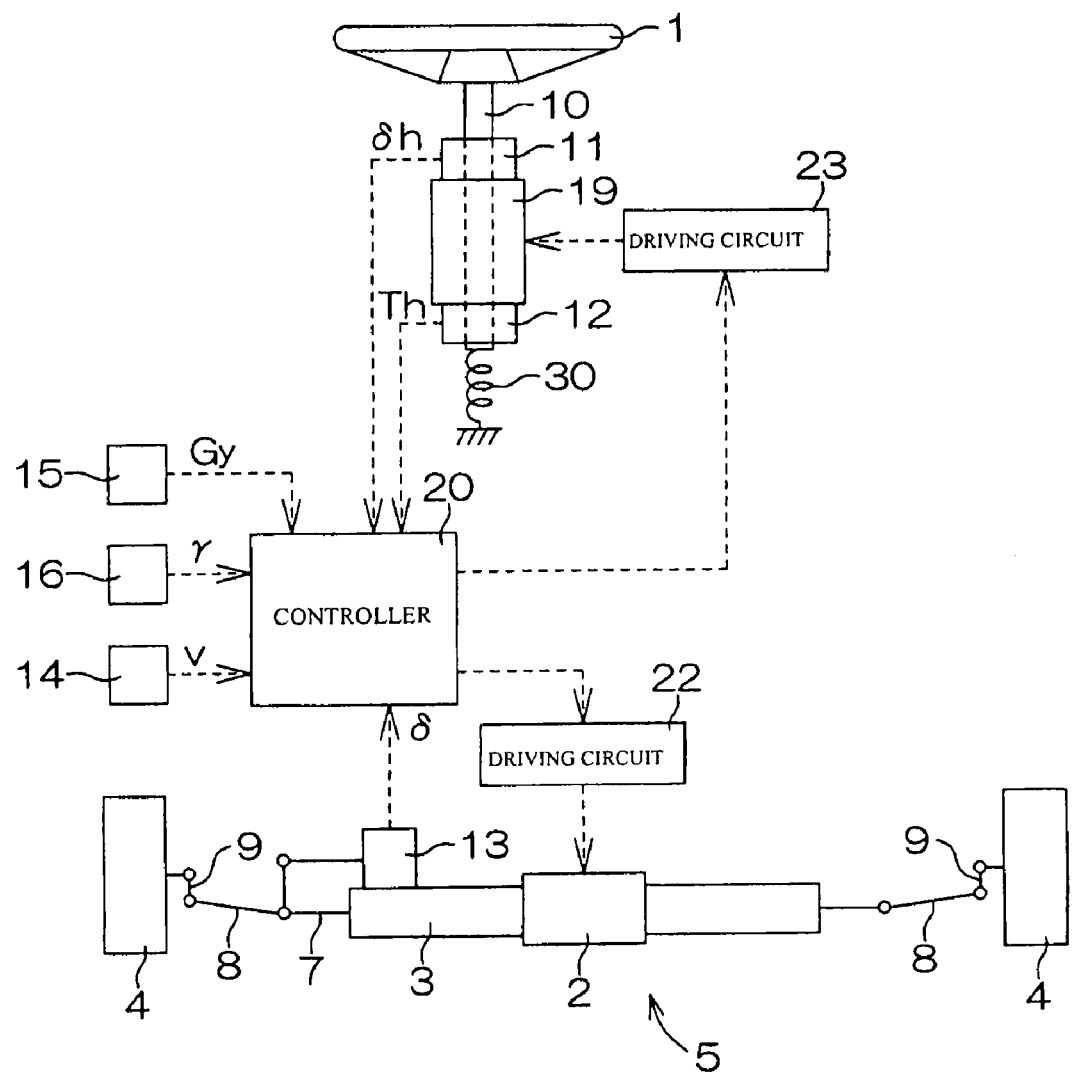
FIG. 1 is a schematic diagram of one embodiment of the steering device for the vehicle according to the present invention.

A preferred embodiment of a steering device for a vehicle according to the present invention will be described referring to FIG. 1 to FIG. 3. FIG. 1 is a schematic diagram explaining one embodiment of the present invention of the steering device for the vehicle exemplifying in a steer-by-wire system. The steering device for the vehicle of the one embodiment of the present invention is equipped with a steering wheel 1 as a steering member driven by a driver, a steering actuator 2 driven in response to a steering rotation of the steering wheel 1, and a steering gear 3 transmitting a driving force by the steering actuator 2 to front right and left steered wheels 4. There are no mechanical connections between the steering wheel 1 and a steering mechanism 5 including the steering actuator 2 but the steered wheels 4 are steered by controlling to drive the steering actuator 2 for steering according to an amount of the steering of the steering wheel 1. The amount of steering is a steering angle or a steering torque.

The steering actuator 2 is constructed with an electrically driven motor of well known brushless motor. The steering gear 3 has a motion transforming mechanism from rotational motion of an output shaft of the steering actuator 2 to linear motion of steering rods 7, that is linear motion of the steered wheels 4 moved to right or left. The motion of the steering rods 7 is transmitted to the steered wheels 4 through tie-rods 8 and knuckle arms 9 to change an angle of a toe, that is a steered angle, of the steered wheels 4. The steering gear 3 can be equipped by any well known members and it is not restricted to a particular member but any construction to transmit to the steered wheels 4 in order to change the motion of the steering actuator 2 to the steered angle. Besides, a wheel alignment is adjusted to return the steered wheels 4 to a straight running position by a self-aligning torque.

The steering wheel 1 is connected to a rotating shaft 10 rotatably supported on a vehicle body. On the rotating shaft 10 is mounted a reaction actuator 19 generating a reaction torque Tm acting on the steering wheel 1. The reaction actuator 19 is constructed with an electrically driven motor of a brush-less motor having an output shaft which is constructed with the rotating shaft 10 in a body.

Between the vehicle body and the rotating shaft 10 is mounted a resilient member 30 imparting resilient force to a direction to urge to return the steering wheel 1 to the straight running position. The resilient member 30 is constructed with, for example, a spring to exert the resilient force to the rotating shaft 10. The steering wheel 1 is returned to the straight running position by the resilient force of the resilient member 30 when the reaction actuator 19 does not impart the torque to the rotating shaft 10.

An angle detecting sensor 11 is mounted for detecting the rotational angle of the steering wheel 1 in order to detect a steering angle δh, that is a rotating angle, of the steering wheel 1. The steering sensor 11 is correspondent to a steering angle detecting member of a steering stage detecting member. A torque sensor 12 is mounted for detecting the torque exerted by the rotating shaft 10 in order to detect steering torque Th acted on the steering wheel 1 by the driver of the vehicle. The steering torque Th is substantially equaled to a steering reaction force. The torque sensor 12 is correspondent to a torque detecting member of a steering reaction detecting member. A steering angle sensor 13 is constructed with a potentiometer detecting an operating amount of the steering rod 7 correspondent to a steering angle δ in order to detect the steering angle δ of the vehicle. The steering angle δ is correspondent to the steering angle of the steering mechanism 5. There are mounted a speed sensor 14 to detect a vehicle speed V, a lateral acceleration sensor 15 to detect a vehicle lateral acceleration Gy, and a yaw rate sensor 16 to detect a yaw rate γ of the vehicle.

The angle sensor 11, the torque sensor 12, the steering sensor 13, the speed sensor 14, lateral acceleration sensor 15 and the yaw rate sensor 16 are connected to a controller 20 constructed with a micro computer. The controller 20 is to control the steering actuator 2 and the reaction actuator 19 through driving circuits 22, 23.

Figure 2:
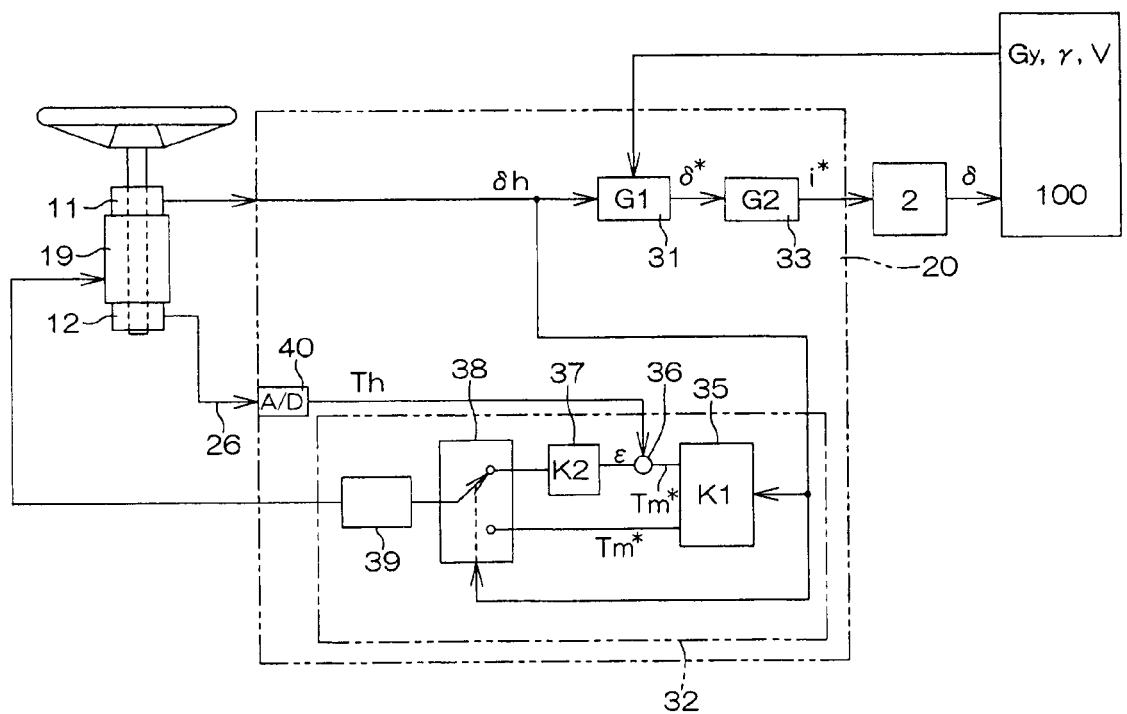
FIG. 2 is a control block diagram of the one embodiment of the steering device for the vehicle according to the present invention.
Figure 3:
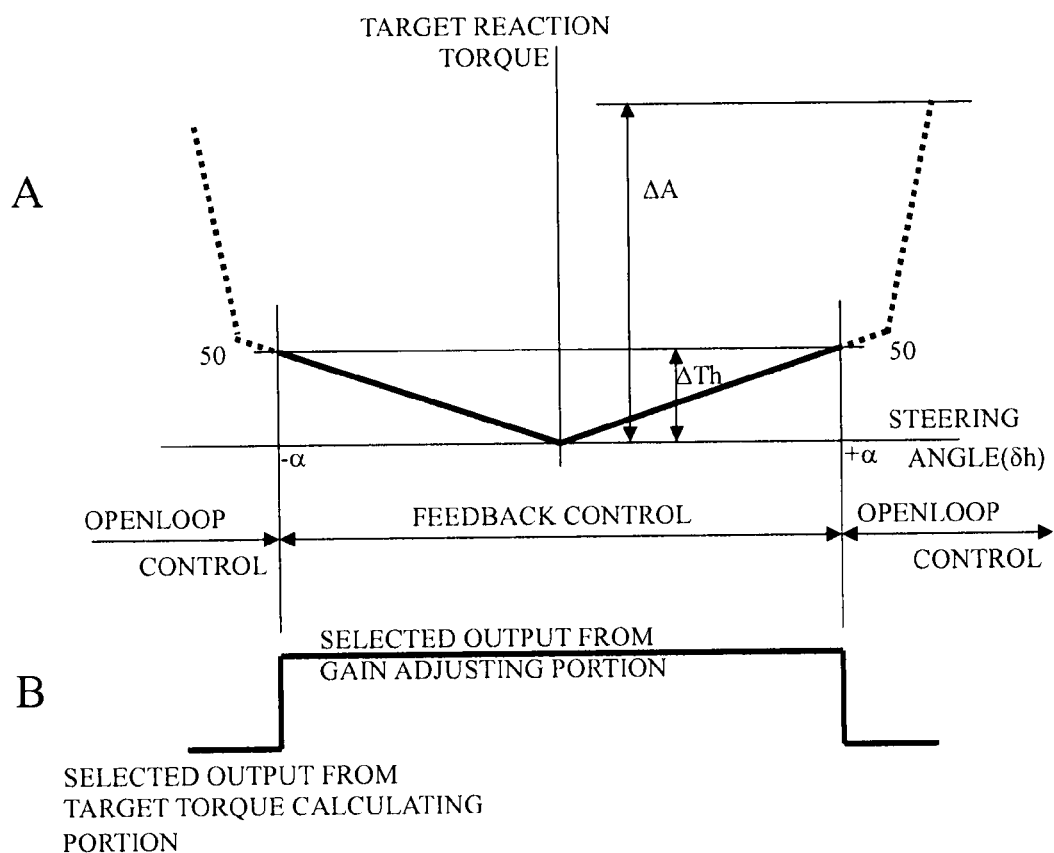
FIG. 3A is an explanatory diagram showing the relationship between the steering angle and the target torque.
FIG. 3B is an explanatory diagram showing the relationship between the steering angle and the switching of the controlled stages.

FIG. 2 shows a control block diagram of the controller 20. The driver acts the steering torque Th and the reaction actuator 19 acts the reaction torque Tm respectively on the steering wheel 1. An analog torque signal output from the driver is input into an analog-digital transformer 40 in the controller 20 through an input port 26 of the controller 20 to be transformed to a digital torque signal. The digital torque signal is imported into the controller 20 for calculation.

The steering angle δh as the operation amount of the steering wheel 1 is detected by the angle sensor 11 to be input into the controller 20. And the lateral acceleration Gy, the yaw rate γ and the vehicle speed V of the vehicle 100, on which the steering device for the vehicle of the present invention is mounted, are respectively input into the controller 20 from the lateral acceleration sensor 15, the yaw rate sensor 16 and the speed sensor 14. The controller 20 is equipped with a target steering angle calculating portion 31, a reaction controlling portion 32 and a target current calculating portion 33 as a function processing portion realized in a software mode by executing a predetermined program. The target steering angle calculating portion 31 calculates a target steering angle $\delta^*$ based on the steering angle $\delta h$, the lateral acceleration Gy, the yaw rate $\gamma$, the vehicle speed V and a transfer function G1. The reaction controlling portion 32 calculates a target reaction torque Tm* based on the steering angle $\delta h$ to control the reaction actuator 19 by the calculated target reaction torque Tm*. The target current calculating portion 33 calculates, based on the target steering angle $\delta^*$ and the transfer function G2, a target current value i* supplied to the steering actuator 2.

The controller 20 supplies a current corresponding to the target current value $\delta^*$ calculated by the target current calculating portion 33 from a driving circuit 22 to the actuator 2 for steering. As a result, a motion of the vehicle 100 is changed. And the controller 20 controls the reaction actuator 19 through the driving circuit 23.

The reaction controlling portion 32 has a target reaction torque calculating portion 35, a deviation calculating portion 36, a gain adjusting portion 37, a switching portion 38 and a current controlling portion 39. The target reaction torque calculating portion 35 calculates the target reaction torque Tm* by multiplying the steering angle $\delta h$ by the gain K1. The deviation calculating portion 36 calculates a deviation $\epsilon(=Tm*-Th)$ between the target reaction torque Tm* and the steering torque Th written by a digital signal from the analog-digital transformer 40. The gain adjusting portion 37 multiples the deviation $\epsilon$ by the gain K2. The switching portion 38 selects either the target torque Tm* or the deviation $K2 \times \epsilon$ adjusted by the gain adjusting portion 37 to input the selected result to the current controlling portion 39. The current controlling portion 39 decides a target driving value, for example a target current value, correspondent to the value which is input from the switching portion 38, and it controls in feedback way to coincide the actual current value of the reaction actuator 19 with the target current value.

Therefore, when the switching portion 38 selects the output from the gain adjusting portion 37, the steering torque Th is fed back to control the reaction actuator 19 so that the reaction actuator 19 is controlled in the feedback way to coincide the actual steering reaction force to the target reaction torque Tm*. On the other hand, when the switching portion 38 selects the target reaction torque Tm* output from the target reaction torque calculating portion 35, the steering actuator 19 is controlled without the feedback of the steering torque Th, that is to say in open-loop way.

FIG. 3A shows a relation between the steering angle $\delta h$ and the target reaction torque Tm*, and FIG. 3B shows a relation between the steering angle $\delta h$ and the switching motion of the switching portion 38. The switching portion 38 selects an output value from the gain adjusting portion 37 in the condition that an absolute value of the steering angle $\delta h$ is in a middle range, that is equal to or less than a predetermined value $\alpha$, for example $\alpha=180$ degrees, where the predetermined value $\alpha$ is bigger than zero, that is $\alpha>0$. The middle range includes a middle point. Therefore, the reaction actuator 19 is controlled in the feedback way based on the steering torque Th in this middle range. On the other hand, the switching portion 38 selects an output value from the target reaction torque calculating portion 35 in the condition that the absolute value of the steering angle $\delta h$ is over the predetermined value $\alpha$. Therefore, the reaction actuator 19 is not controlled in the feedback way of the steering torque Th for the reaction control but controlled in an open-loop way.

The target reaction torque calculating portion 35 is preset the target reaction torque Tm* in a way that the target reaction torque Tm* increases relatively slowly according to an increase of the absolute value of the steering angle $\delta h$ in the middle range, it increases in linear line in the one embodiment of the present invention. On the other hand, the target reaction torque calculating portion 35 is preset the target reaction torque Tm* in a way that the target reaction torque Tm* increases rapidly according to an increase of the absolute value of the steering angle $\delta h$ over the middle range. In this real situation of the one embodiment, the target reaction torque Tm* increases relatively slowly according to an increase of the absolute value of the steering angle $\delta h$ until it reaches to a turning point 50 where it is positioned a little beyond the predetermined value $\alpha$ and increases rapidly according to the large absolute value of the steering angle $\delta h$ over the turning point 50.

The predetermined value $\alpha$ is preset smaller than a value of a stroke end of full stroke of the steering angle $\delta h$. In this real situation of the one embodiment, the predetermined value $\alpha$ is preset in a way that a range of the steering angle within $\pm \alpha$ is approximately 75% of the full range of the steering angle $\delta h$.

The middle range is correspondent to a range $\Delta Th$ of the steering torque Th executed for the feedback control of the reaction actuator 19. Therefore, it is enough for the output from the torque sensor 12 to be input into the controller 20.

In the one embodiment of the present invention, the range $\Delta Th$ of the steering torque Th is correspondent to full range of an input voltage to the analog-digital transformer 40. This situation is preset by adjusting adequately a gain of an unillustrated sensor amplifier amplifying the output signal from the torque sensor 12.

Therefore, the analog-digital transformer 40 transforms its analog signal of the steering torque to the digital torque signal in connection with the analog torque signal only in the range $\Delta Th$ of the steering torque Th. As the result, it can be for the present invention to perform extremely high resolution of the digital torque signal to the controller 20 in the torque range $\Delta Th$ compared to the related art transforming the analog torque signal in full range of the steering torque $\Delta Th$ to the digital torque signal.

As explained above, the present invention of the steering device for the vehicle can control high accurately in feedback way the reaction actuator 19 to make a steering feeling better because the reaction 19 is controlled in feedback way in accordance to the steering torque Th input with the high resolution. In the present invention, the steering torque Th is not controlled in feedback way but controlled in the open-loop way over the predetermined value $\alpha$ of the steering angle $\delta h$ since there is no need to control precisely the steering torque Th around the stroke end because of the large target reaction torque Tm. Therefore, this open-loop control over the predetermined value $\alpha$ has a merit to be simplified without making the steering feeling worse.

While the invention has been described in detail with reference to the preferred embodiment, it will be apparent to those skilled in the art that the invention is not limited to the present embodiment, and that the invention may be realized in various other embodiments within the scope of the claims.

For example, the steer-by-wire system has been described in the one embodiment of the present invention, the same control can be applied to a variable gear ratio steering device being variable in a relation between the steering angle and the steered angle. In this variable gear ratio steering device, there is no need to separate the mechanical connection between the steering wheel and the steered wheel it may be connected mechanically through the variable gear ratio unit, especially having an irreversible mechanism of a worm and worm wheel mechanism which can not transmit a self-aligning torque of the steered wheel nor a stroke end reaction to the steering wheel. And also, the present invention can be applicable to an electrical power steering, an electro-pump power steering and hydraulic power steering to control the reaction force applied to the steering wheel.

What is claimed is:

1. A steering device for a vehicle having a reaction actuator for applying a steering reaction force to a steering member, comprising:
a steering angle detector for detecting a steering angle of said steering member;
a reaction controller for controlling said reaction actuator according to said steering angle detected by said steering angle detector; and
a steering reaction force detector for detecting the steering reaction force acting on said steering member,
wherein said reaction controller includes a switch directing said reaction controller to control said reaction actuator in a feedback way based on said steering reaction force detected by said steering reaction force detector when said steering angle detector detects that said steering angle is in a predetermined range including a middle point, wherein the switch directs said reaction controller to control said reaction actuator in an open-loop way without feeding-back said steering reaction force detected by said steering reaction force detector when said steering angle detector detects that said steering angle is out of said predetermined range.

2. A steering device for a vehicle according to claim 1, wherein said steering reaction force detector includes a torque detector for detecting a steering torque acting on said steering member.

3. A steering device for a vehicle according to claim 1, wherein said reaction controller includes an analog-digital transforming member for transforming an analog output signal of said steering reaction force detector to a digital output signal; and
said reaction controller controls said reaction actuator in said feedback way based on said digital output signal transformed by said analog-digital transforming member.

4. A steering device for a vehicle according to claim 1, wherein said steering device is a steer-by-wire system.

5. A steering device for a vehicle according to claim 1, wherein said steering device is a power steering device.

6. A steering device for a vehicle having a reaction actuator for applying a steering reaction force to a steering member, comprising:
a steering angle detector for detecting a steering angle of said steering member;
a reaction controller for controlling said reaction actuator according to said steering angle detected by said steering angle detector; and
a steering torque detector for detecting a steering torque acting on said steering member;
wherein said reaction controller includes an analog-digital transforming member for transforming an analog output signal of said steering torque detector to a digital output signal, and a switch directing said reaction controller to control said reaction actuator in a feedback way based on said output signal transformed by said analog-digital transforming member when said steering angle detector detects that said steering angle is in a predetermined range including a middle point, wherein the switch directs said reaction controller to control said reaction actuator in an open-loop way without feeding-back said steering reaction force detected by said steering torque detector when said steering angle detector detects that said steering angle is out of said predetermined range.

7. A steering device for a vehicle having a reaction actuator for applying a steering reaction force to a steering member, comprising:
a steering angle detecting means for detecting a steering angle of said steering member;
a reaction controller for controlling said reaction actuator according to said steering angle detected by said steering angle detecting means; and
a steering torque detecting means for detecting a steering torque acting on said steering member;
wherein said reaction controller includes an analog-digital transforming means for transforming an analog output signal of said steering torque detecting means to a digital output signal, and switch means directing said reaction controller to control said reaction actuator in a feedback way based on said output signal transformed by said analog-digital transforming means when said steering angle detecting means detects that said steering angle is around a predetermined range including a middle point, and wherein the switching means directs said reaction controller to control said reaction actuator in an open-loop way without feeding-back said steering reaction force detected by said steering torque detecting means when said steering angle detecting means detects that said steering angle is out of said predetermined range.

8. A steering device for a vehicle having a steering member, comprising:
a reaction actuator for applying a steering reaction force to said steering member;
a steering angle detector for detecting a steering angle of said steering member;
a steering reaction force detector for detecting the steering reaction force acting on said steering member; and
a reaction controller for controlling said reaction actuator, comprising:
a target reaction torque calculating portion that receives a steering angle from the steering angle detector and calculates the target reaction torque;
a deviation calculating portion that receives the calculated target reaction torque and a steering torque applied to the steering member, and calculates a deviation between the target reaction torque and the steering torque applied to the steering member; and
a switch that selects the target reaction torque as an output from the reaction controller to control said reaction actuator when the steering angle detector detects that said steering angle is in a predetermined range including a middle point, and selects the deviation between the target reaction torque and the steering torque applied to the steering member as an output from the reaction controller to control said reaction actuator when the steering angle detector detects that said steering angle is out of said predetermined range.

* * * * *